United States Patent [19]

Huber et al.

[11] Patent Number: 4,568,455
[45] Date of Patent: Feb. 4, 1986

[54] SCREENING DEVICE

[75] Inventors: Gene A. Huber, Los Angeles; Bill A. Racine, Hacienda Heights, both of Calif.

[73] Assignee: Sweco, Incorporated, Los Angeles, Calif.

[21] Appl. No.: 510,380

[22] Filed: Jul. 1, 1983

[51] Int. Cl.⁴ .............................................. B07B 1/49
[52] U.S. Cl. .................................... 209/405; 209/413; 101/127.1; 156/160
[58] Field of Search ........................... 101/127.1, 128.1; 209/403–405, 413; 210/495, 232, 350, 351; 156/160

[56] References Cited

U.S. PATENT DOCUMENTS 3,176,843  4/1965  Hoskins et al. .................... 209/403
3,214,314  10/1965  Rowbottom ....................... 156/160
3,968,033  7/1976  Illemann et al. .................... 209/403
4,044,669  8/1977  Luther ............................ 101/127.1
4,357,869  11/1982  Wadstein ......................... 101/127.1

FOREIGN PATENT DOCUMENTS 1186310  1/1965  Fed. Rep. of Germany ...... 209/403

Primary Examiner—Charles Hart
Attorney, Agent, or Firm—Lyon & Lyon

[57] ABSTRACT

A screening device having an inflatable screen frame and a rigid screen frame member. The frame assembly expands with inflation in a self-controlled manner to tension the associated screen cloth and to fix the frame within the screening device. A method of making screen assemblies is also disclosed using heated screen cloth to fuse the frame thereto.

17 Claims, 9 Drawing Figures

SCREENING DEVICE

BACKGROUND OF THE INVENTION

The field of the present invention is screening systems and screening assemblies therefor.

Modern screening devices employed in commercial processing operations characteristically use tensioned screens which are subjected to either vibration or centrifugal action and frequently experience high loads and abrasive action. The requirements placed on the screen assemblies employed within such modern commercial devices long ago resulted in the abandonment of the familiar mounting methods used for such devices as window screens and the like. The tensioning loads place substantial structural requirements on the screen frames as do the vibrational or centrifugal loads and the weight and inertia of the material being processed therethrough. The loading and abrasive action also create specific problems at the intersection of the screen cloth and the screen frame. If these exceptional requirements are not specifically addressed, early screen failure is experienced, such failure manifesting itself as a slackening of the screen or parting of the screen from the frame, as frame warpage or failure, or as failure of the screen cloth at the intersection with the frame.

The association between the screen assembly and the overall screening device also requires attention in a commercial setting. For maximum use of any screening device, it is beneficial to insure both rigid placement and retention of the screen assembly therein and quick removal and replacement of that assembly. The large variety of tasks to which modern screening devices are put has required facile removal and replacement of screens for a number of reasons. In food processing or where multiple batch processing is employed, the screens must be removed for cleaning on a regular basis. Also in batch processing, the screens may require frequent replacement to vary the mesh size thereof. In processing certain materials, frequent cleaning is required to overcome the problem of screen blinding. And, of course, in highly abrasive environmehts, screens must be frequently replaced as they simply wear out at a rapid rate. Consequently, secure placement, quick removal and accurate positioning are essential requirements for screen assemblies in modern commercial screening devices.

As an example of a modern screening device, reference is made to U.S. Pat. No. 3,899,414 to Leslie T. Hansen entitled "Drilling Mud Separation System". This device includes a cylindrical housing employing a screen extending across the housing. The device is subjected to vibration for enhanced screening action. The disclosure of the Hansen patent is incorporated herein by reference as showing a typical screening device employed in a relatively harsh environment, that of well drilling mud processing.

In commercially designing screen assemblies, a variety of approaches have been used to meet the adverse conditions experienced and yet to attempt to keep the cost of such screens to a minimum. In some applications, the need to replace screens is so great that the cost of replacement screens becomes a major cost factor in the screening process. To this end, devices have been designed for facile replacement of the screen cloth itself in a relatively complicated frame which acts to tension the cloth when positioned. One such device is illustrated in U.S. Pat. No. 2,213,773 to L. G. Symons, entitled "Means For Supporting and Tensioning Screen Cloth". In spite of the advantageous feature that the screen frames themselves do not require replacement, such screen cloth replacement systems have not found general acceptance.

A variety of other efforts have been undertaken to reduce the cost of such screen assemblies by reducing the cost of the initial fabrication or by attempting to improve the life of the screen. One such successful screen assembly is illustrated in U.S. Pat. No. 3,915,775 to Calvin D. Davis entitled "Method of Bonding A Plastic Tension Ring To A Screen". The Davis device is generally of molded plastic with a central metal member for structural rigidity. Soft material is located at the intersection of the screen cloth with the screen frame to spread the stress loading of the screen at that point and reduce abrasion. The disclosure of the Davis patent is incorporated herein by reference as illustrative of such features. In spite of the utility and commercial success of this modern screen, the molding of the screen frame and the number of steps involved in the fabrication of the assembly makes such screen assemblies relatively expensive, particularly when highly abrasive environments force frequent replacement thereof.

In placing commercial screens in screening apparatus, a variety of approaches have been taken. One such approach is illustrated in the Hansen patent, U.S. Pat. No. 3,899,414, referred to above. In the Hansen device, the outer rim of the screen frame sits between two axially aligned portions of the cylindrical housing, all of which is held in place by a conventional clamp band. Another approach for mounting screen frames to allow for easy removal thereof is illustrated in U.S. Pat. No. 2,279,042 to D. J. Harrington, entitled "Screening Apparatus". In the Harrington device, cylinders and pistons are employed to hold down the corners of the screen frames. The complication of the Harrington device in a vibratory screening structure is highly disadvantageous. On the other hand, the Hansen device is uncomplicated and inexpensive but does require partial disassembly of the screening device for replacement of the screen. Caught between providing a very rigid supporting structure for the screen assemblies and providing an easily disassembled system, most modern commercial screening systems generally have exhibited either overcomplicated placement mechanisms or overcomplicated disassembly and assembly requirements.

Attempts have been made to employ elements attached to the structure of the screening system itself rather than an independent frame, for supporting the tension load of the screen. To this end, untensioned screens are generally placed in such devices and tensioned by means of inflatable members supported by extensions of the frame. In this regard, reference is made to U.S. Pat. No. 3,176,843 to R. J. Hoskins, et al., entitled "Screen Tensioner" and to French Pat. No. 883,576, issued Mar. 29, 1943. Each of these devices requires substantial structure associated with or added to the frame of the screening device to contain and control the expansion of the tensioning pneumatic member. It would appear from the disclosure of these devices that there would be no easy screen replacement, a difficulty encountered by the mechanisms employing other screen cloth replacement systems as well.

SUMMARY OF THE INVENTION

The present invention is directed to screening devices and screen assemblies employed therein. The screen assemblies of the present invention include a frame which can itself be expanded by inflation in a manner controlled in large part by the very structure of the frame. This directed expansion may also act to fix the assembly within a screening device. Through the present invention, screen assemblies are available which do not require expensive fabricating techniques, are not required to carry fully tensioned loads when not in position within the screening device, and are easily placed, retained and removed from the screening device. The ease of fabrication and the structural simplicity result in low cost screen assemblies and screening devices with low maintenance and replacement costs.

Screen assemblies fabricated to create a device of the present invention may be made by heating the screen cloth with a thermoplastic screen frame pressed thereagainst. When the screen frame begins to fuse, the cloth is embedded within the frame, at which time the assembly may be cooled. This procedure locks the screen cloth into the body of the frame member such that tension on the screen cloth is easily withstood. Furthermore, the act of moving the screen cloth into the fused portion of the frame resulted in a lip being formed through plastic deformation of the inner edge of the frame. As the lip is relatively thin, it provides a force transition area to reduce the stress concentration at the intersection of the screen cloth with the frame member. As the screen cloth is embedded in the lip, abrasion at this critical location is reduced.

With the present invention, the screen frame may be fabricated, if desired, from extruded stock. As substantial deformation is contemplated in use of the device, tolerance requirements are minimized. Furthermore, the screen need not be tensioned prior to assembly and can, therefore, rely in part on the structural rigidity of the housing for support. These factors make possible inexpensive fabrication of screen assemblies through the use of such extruded stock. When thermoplastic materials are used, the fabrication steps are also greatly simplified. The abutting ends of the extrusion may be easily fused to form the frame.

In another aspect of the present invention, a separate rigid frame member may be employed with the expansible frame. This member may be used to provide a base of sufficient rigidity for directing the expansion of the expansible frame to advantageously tension the screen. The rigidity of this frame member, of course, can be incorporated into the expansible frame where desired.

Thus, the present invention advantageously reduces the need for complicated and expensive frame members and assembly procedures and makes placement and removal of the screen assemblies in the associated screening devices very easy. Furthermore, abrasion and vibrational loading forces are appropriately controlled. Accordingly, it is an object of the present invention to provide improved screening assemblies and screening devices incorporating such assemblies. Other and further objects and advantages will appear hereinafter.

DETAILED DESCRIPTION OF THE PREFERRED EMBODIMENT

Figure 3:
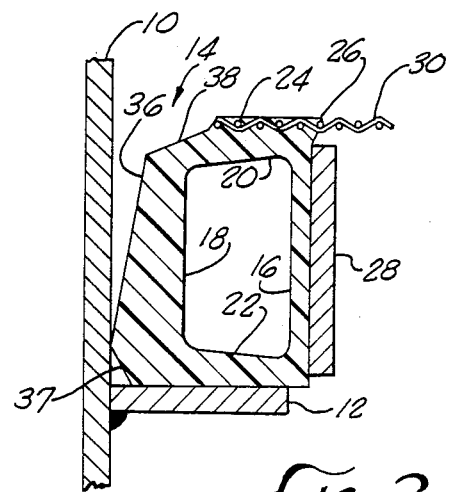
FIG. 3 is a cross-sectional elevation detail of an uninflated screen assembly in position within a screening device.
Figure 4:
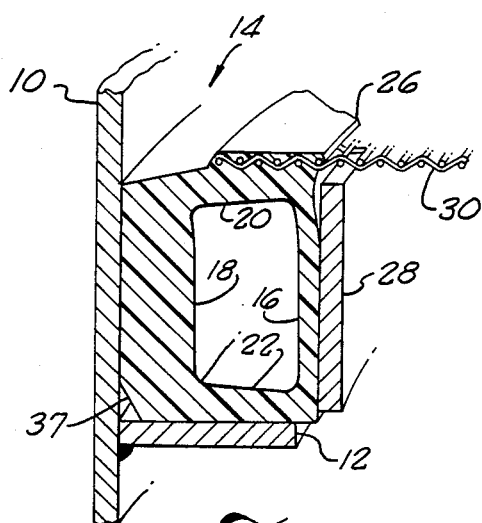
FIG. 4 is an inflated assembly as shown in FIG. 3 illustrated in prospective.
Figure 5:
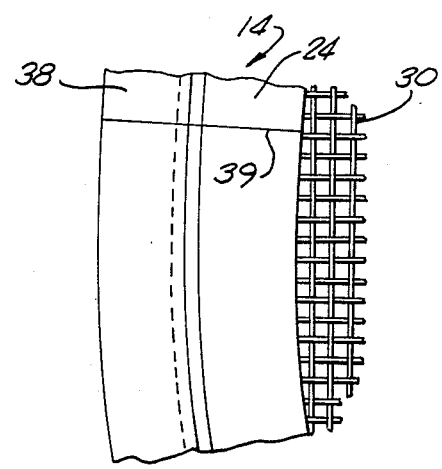
FIG. 5 is a plan view of the screening apparatus of FIG. 4 disassembled from a screening device.

Turning in detail to the drawings and looking specifically to FIGS. 3, 4 and 5, a preferred embodiment of the present invention is illustrated. A screening device including a substantially cylindrical housing 10 is contemplated for use with the present invention. A device specifically structured for the screen assembly of the present invention is shown in FIGS. 3 and 4 as including an inwardly extending flange 12 which is conveniently welded to the substantially cylindrical housing 10. The housing 10 need not be exactly cylindrical because of the expandable nature of the resulting screen assembly to fit or even round out any slightly ovular shape of the cylindrical cross-section.

Positioned within the substantially cylindrical housing 10 of the screening device is a screen assembly. As noted above, the screen assembly is deflated in FIG. 3 and is inflated in FIG. 4. This screen assembly includes an expansible frame, generally designated 14. This frame 14 is generally rectangular in cross-section, as can be seen in the figures. The overall shape of the frame 14 is a closed planar curve which may approximate a rectangular shape but is a circular curve in the most preferred embodiment. That is to say, the frame is circular and generally lies in a plane such that the screen cloth of the assembly will lie in a plane as well. The maximum outside diameter of the frame 14 is relatively equal to the nominal inside diameter of the housing 10 for easy placement and removal of the screen assembly when in the deflated condition. Thus, it can be positioned as seen in the figures.

Looking then specifically to the construction of the frame 14, it is preferably of a thermoplastic elastomer which is resiliently expansible. The thermoplastic nature of the material is employed principally for ease of fabrication as will be discussed below. The resilient and expansible nature of the material is designed to accommodate some deformation when subjected to inflation. However, the structure must also be rigid enough in thick cross-section to provide the required structural support. The proper selection of material and corresponding structural thicknesses useful for any given use of the present invention must be determined from empirical analysis and conventional design considerations.

The somewhat rectangular cross-section of the frame 14 is defined by four integral walls. A first wall 16 is relatively thin in relationship to the remaining portions of the structure and is located on the inside of the frame 14. A second or outer wall 18 is thicker than the inner wall 16 by at least two times. In this way, inflation of the frame 14 results in controlled deformation with less resistance to deformation presented by the inner wall 16 than by the outer wall 18. Third and fourth walls 20 and 22 extend between the walls 16 and 18 to complete the rectangular cross-section. The walls 20 and 22 need not be as thick as outer wall 18 or as thin as inner wall 16. That is to say, there is no need for the walls 20 and 22 to be as deformable as the inner wall 16 or as inflexible as the outer wall 18. However, the upper wall 20 should be of sufficient rigidity to prevent extreme distortion when the screen assembly is inflated and the screen tensioned. The hollow cavity defined by walls 16, 18, 20 and 22 is maintained in a closed state such that the device may be inflated as intended.

Looking specifically to the upper wall 20, an upstanding ridge 24 is used for convenient assembly with the screen cloth. On the inside edge of this ridge, a lip 26 extends inwardly in relatively thin section. The lip 26 provides a transitional area where the screen cloth is received. As the lip 26 becomes progressively thicker, it joins with the main body of the frame 14. Simultaneously, the increase in structural resistance to flexure is provided such that there is no one point or line of intersection between the exposed screen cloth and the inner edge of the frame 14 where flexure forces are concentrated. In this manner, screen life at this difficult intersection is enhanced.

A rigid frame member 28 is, as can be seen in the figures, positioned concentrically inwardly of the frame 14. This frame member 28 is relatively rigid compared to the frame 14 and may conveniently be a metallic ring. The width of the metallic ring 28 is preferably shorter than the height of the inside wall of the frame 14. For improved screen life, it is preferred that the upper edge of the metallic ring 28 not come in contact with the screen cloth itself, which would result in excessive stresses and abrasions. The ring 28 may, on the other hand, extend downwardly below the bottom of the frame 14 but would serve no purpose specifically related to the present invention and would make insertion to the proper depth within the frame 14 more difficult. For ease of placement and retention, the frame member 28 is preferably of sufficient overall width to provide an interference fit with the inner wall 16 of the frame 14 when in the uninflated state. With such an interference fit, the frame 14 and the frame member 28 may be handled without specifically making provision for the retention of the two parts together. However, the fit need only be close so that the frame 14, when inflated, will come into contact with the frame member 28 and still have sufficient expansion to tension the screen.

The screen assembly is completed by the addition of screen cloth 30 which, in a preferred embodiment employing thermoplastic elastomer, is embedded within the upstanding wide ridge 24. The excess screen cloth 30 which extends radially outwardly from the upstanding wide ridge 24 is removed. The screen cloth 30 may be of any useful mesh size as determined by the intended use of the assembly.

Figure 1:
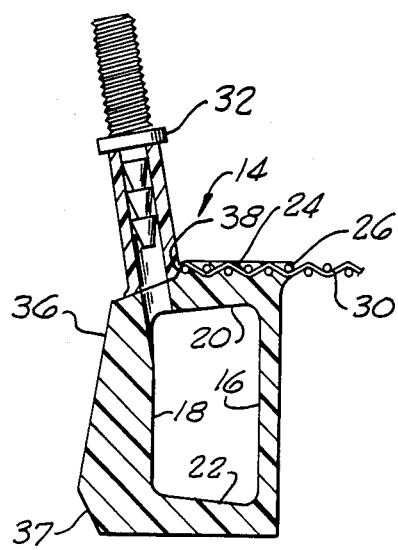
FIG. 1 is cross-sectional elevation of an assembled frame and screen cloth illustrating a valve stem and valve assembly.
Figure 8:
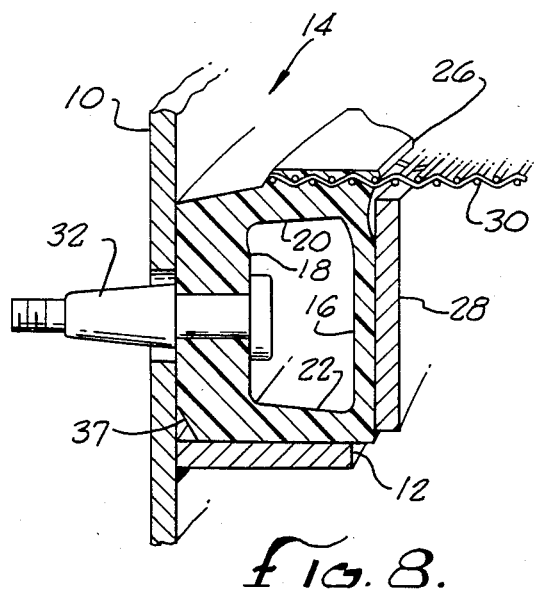
FIG. 8 is an inflated assembly as shown in FIG. 4 with an alternate valve location.
Figure 9:
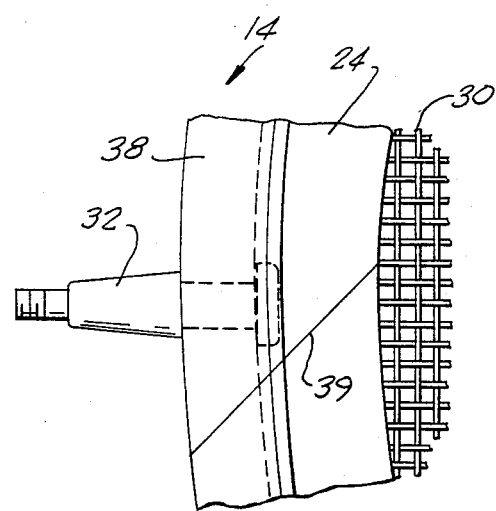
FIG. 9 is a plan view of the device of FIG. 8.

To inflate the hollow interior of the frame 14, a means for admitting and retaining pressure is employed. This means is illustrated in FIG. 1 in the preferred embodiment as a valve stem 32. The valve stem is positioned through the upper wall 20. An alternate location and assembly for the valve stem is illustrated in FIGS. 8 and 9. A hole is provided in the cylindrical housing 10 to accommodate the outward extension of the valve in this second embodiment. When positioned as can best be seen in either FIG. 1 or FIG. 8, the valve 32 is easily accessible for inflation or deflation of the frame 14. The illustrated valve 32 is a pneumatic device. However, it is contemplated within the present invention to employ whatever useful fluid may be chosen. Shop air is normally the most convenient fluid. However, for high load applications as might be required by very heavy screen cloth, hydraulic fluid may be employed. It is also contemplated that a chemically reactive mixture in fluid form may be introduced into the hollow cavity which expands and solidifies into a permanently expanded state.

To accommodate the introduction and expansion of fluid within the frame 14, an outer surface is provided on the wall 18 which is tapered inwardly as it approaches the wall 20 to which the screen 30 is anchored. A taper 36 is illustrated in FIG. 3 in the uninflated assembly. Inflation of the frame 14 causes the inner wall 16 to force itself against the frame member 28. The relative strength of the frame member 28 is such that it will resist such expansion of this inner wall. Consequently, the only remaining area for expansion is the space defined between the inner side of the cylindrical housing 10 and the taper of the outer wall 18. This room for expansion is greatest at the area adjacent the upper wall 20 containing the screen 30. Consequently, the frame 14 will move outwardly to contact and press against the cylindrical housing 10. This motion results in a tensioning of the screen cloth 30 and in the retention of the frame 14 in the cylindrical housing 10. Thus, rigid placement and screen tensioning is effected by mere inflation of the assembly.

The wall 18 is also beveled to form a bevel surface 37. The bevel moves the location of the maximum outside diameter up and away from the corner of the screening device where the screen frame must fit. Thus, the corner treatment of the screening device is less critical as is the diameter of the frame itself. A taper on the top at 38 is employed to give added space for trimming of the screen once assembled with the frame.

The rigid placement also provides structural rigidity to the frame member through its association with the cylindrical housing 10. As can be well understood by one of ordinary skill in the art, the material and structural size of the frame 14 must be such that it can, with inflation, expand against the cylindrical housing 10. It further will be understood that the frame member 28 must be of sufficient rigidity to resist expansion in an inward direction so as to insure the proper end result. Without suggesting that the invention is limited thereto, a preferred embodiment for the frame member 28 includes a cross section of 1"×¼" for a ring approximately 44 inches in diameter.

Fabrication of the frame 14 is, in the preferred embodiment, by extrusion. Extrusion is a relatively continuous process and is considered inexpensive when used in a commercial application. The extrusion is cut to the appropriate length. It is then formed into a circle and joined at a seam 39 as seen in FIG. 5. The seam 39 is preferably formed by fusing both ends of the extruded section with rapid placement together. An alternate seam 39 is illustrated in FIG. 9 as having a bevel. The bevel performs two primary functions. First, it provides an increased weld surface. Secondly, it provides access to the outer wall 18 of the frame 14 for the alternate placement of the valve 32 as shown in FIG. 8 prior to welding of the two ends together.

To provide some further insight into the structure of the preferred embodiment, again without suggesting that the invention is limited thereto, the following dimensions are noted. The frame 14 employed with a 100 mesh screen has an overall height of 1.437 in., an overall width across the top of 0.78 in. and a taper 36 of 10° on the outside surface thereof. The inner wall 16 is 0.093 in. thick, the outer wall 18 is 0.41 in. thick at the widest point and the third and fourth walls 20 and 22 are somewhat tapered with fourth wall 22 having a minimum thickness of 0.156 in. The upstanding wide ridge 24 is 0.50 in. in width and 0.046 in. in height. The top tapers downwardly from the back of the wide ridge 24 at a 20° angle. The bevel 37 is taken at 30° from the vertical and has a height of 0.187 in.

Figure 6:
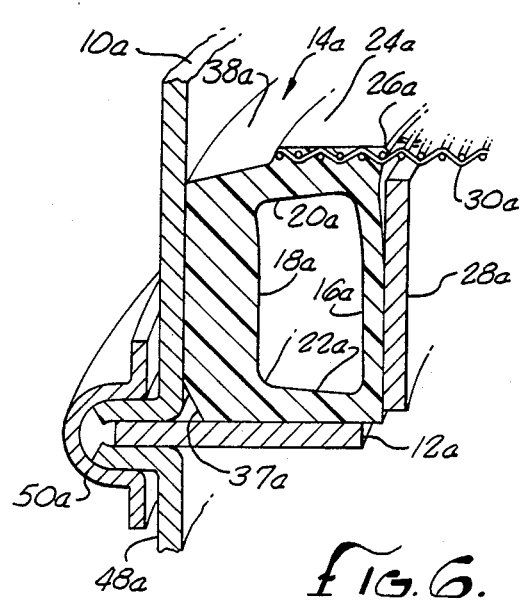
FIG. 6 is an alternate embodiment of the screening device illustrated with the screen assembly of FIG. 4.
Figure 2:
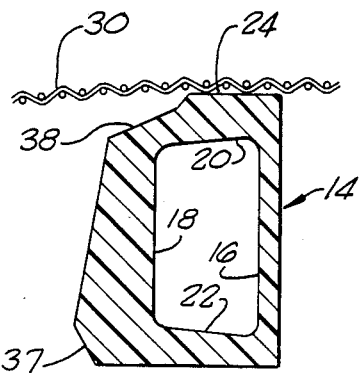
FIG. 2 is a cross-sectional elevation detail of the frame and screen prior to assembly.

FIG. 6 illustrates an alternate embodiment which is compatible with screening devices presently on the market. The variation is simply to employ a cylindrical housing 10a which is provided in segments with outwardly extending flanges 48a which receive the inwardly extending flange 12a. The assembly is then held together by clamp bands 50a.

Figure 7:
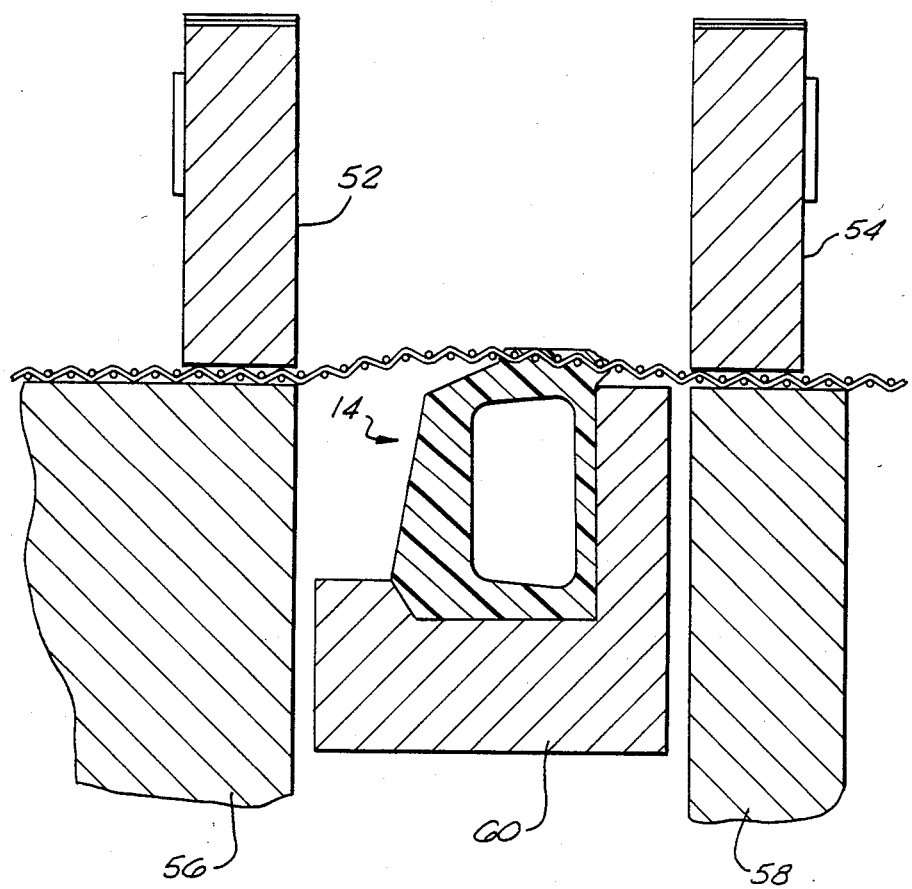
FIG. 7 is an elevation of a screen in preparation for assembly in accordance with the preferred method.

A preferred method for the manufacture of screens of the present invention employs the set up as illustrated in FIG. 7. The Figure is illustrated to be a cross section taken of a circular arrangement. Each of the components illustrated with the exception of the screen cloth is circular in arrangement about a common axis. The process employed is designed to provide maximum bonding integrity between the screen cloth and the frame. At the same time, inexpensive material and minimum labor is contemplated for the manufacture of each screen.

With the present device, it is not necessary to tension the screen cloth prior to bonding of the screen cloth to the frame. It is only necessary that the wrinkles be eliminated from the screen material and that it be lying relatively flat. Naturally, the screen frame must be positioned such that it may be brought into contact with the screen cloth. The bonding of the screen cloth to the thermoplastic frame is accomplished by resistance heating of the screen cloth. In the present process of FIG. 7, a first circular electrode 52 is arranged about the outside of the frame while a concentric circular electrode 54 is positioned about the inside of the screen frame. An electrical potential of four volts is then designed to be applied between the electrodes 52 and 54 resulting in a current of approximately 2200 amps moving radially across the annular portion of the screen cloth extending between the electrodes. The current is applied for approximately 48 seconds; however, this time can vary substantially with variations in screen cloth, mesh size, thermoplastic material and the like.

The sizable current required has a tendency to burn holes in the screen cloth if full contact is not made. Therefore, backup, insulated blocks 56 and 58 are employed below the screen cloth 30 to allow the electrodes 52 and 54 to press against the screen cloth before current is applied to achieve sufficient contact to avoid burning and arcing. Additionally, it may be advantageous to place some tension on the screen cloth, particularly with fine mesh screens, to insure proper bonding. This may be accomplished by placing a light pressure in the upward direction on the screen frame 14 by its supporting jig 60. The light pressure may allow additional plastic to move upwardly through the screen cloth as it is fused to insure proper bonding.

Once the bonding has been completed, the voltage is withdrawn and the heat required to fuse the thermoplastic quickly dissipates. The newly assembled screen is thus immediately able to be withdrawn for trimming of the excess screen cloth outwardly of the wide ridge 24.

The valve assembly 32 is assembled with the frame 14 on the upper wall 20 of the frame outwardly of the trimmed screen 30. A thermoplastic tube is attached to the frame 14 by heating the frame 14 and one end of the thermoplastic tube. The frame may be heated with a heat gun while the tube may be placed against a hot plate. The tube and frame are then quickly fused together. A hole is then drilled through the upper wall 20 of the frame 14 as guided by the bore of the tube. A valve is then forced into the tube to complete the valve assembly 32.

Thus, an improved screen assembly, screening device and method of making same are here disclosed. While embodiments and applications of this application have been shown and described, it would be apparent to those skilled in the art that many more modifications are possible without departing from the inventive concepts herein. The invention, therefore, is not to be restricted except by the spirit of the appended claims.

What is claimed is:

1. A screen assembly comprising
   a frame defining at least a segment of a closed planar curve, said frame being hollow, fluid tight, of resiliently expansible material, and having a first wall on the inside of said curve, a second wall on the outside of said curve, and a third wall extending between said first and second walls, said first wall being substantially thinner than said second wall and said second wall having an outer surface tapered inwardly approaching said third wall;
   means for admitting and retaining pressurized fluid in said frame;
   a frame member concentrically positioned inwardly of and fitting closely within said first wall of said frame, said frame member being substantially more rigid than said frame; and
   a screen fixed to said third wall of said frame.

2. The screen assembly of claim 1 wherein said frame is substantially rectangular in cross-section and includes a fourth wall extending between said first and second walls.

3. The screen assembly of claim 1 wherein said screen is embedded in said third wall.

4. The screen assembly of claim 1 wherein said screen is embedded in said third wall by fusion of the surface of said third wall.

5. The screen assembly of claim 1 wherein said first frame member includes an inwardly extending lip of material embedding a portion of said screen.

6. The screen assembly of claim 1 wherein said means for admitting and retaining pressurized fluid includes a valve stem extending through one of said walls.

7. The screen assembly of claim 1 wherein said frame defines a closed, planar, substantially cylindrical curve.

8. The screen assembly of claim 7 wherein said frame is an extruded segment, said segment's ends being joined together by fusion.

9. The screen assembly of claim 1 wherein said fluid is air.

10. The screen assembly of claim 1 wherein said frame is a thermoplastic elastomer.

11. The screen assembly of claim 10 wherein said frame member is a metallic ring.

12. The screen assembly of claim 1 wherein said tapered outer surface is around about 10 degrees.

13. The screen assembly of claim 1 wherein said second wall is more than twice as thick as said first wall.

14. A screening device comprising:
a substantially cylindrical housing;
a screen frame, said screen frame including a frame defining a substantially circular curve, said frame being hollow, air tight, of resiliently expansible material, and having a first wall on the inside of said curve, a second wall on the outside of said curve, and a third wall extending between said first and second walls, said first wall being substantially thinner than said second wall and said second wall having an outer surface tapered inwardly approaching said third wall and having a maximum outer diameter substantially equal to the inner diameter of said housing, means for admitting and retaining pressurized air in said frame, a frame member concentrically positioned inwardly of and fitting closely within said frame, said frame member being substantially more rigid than said frame member, and a screen fixed to said third wall of said frame.

15. The screening device of claim 14 wherein said housing includes an inwardly extending flange, said screen frame being positioned thereon.

16. The screening device of claim 14 wherein said third wall is the uppermost wall of said screen frame within said housing.

17. A screen assembly comprising
a frame defining at least a segment of a closed planar curve, said frame being hollow, fluid tight, of resiliently expansible material, and having a first wall on the inside of said curve, a second wall on the outside of said curve, and a third wall extending between said first and second walls, said first wall being substantially thinner than said second wall and said second wall having an outer surface tapered inwardly approaching said third wall and said third wall being substantially thicker than said first wall;
means for admitting and retaining pressurized fluid in said frame;
a frame member concentrically positioned inwardly of and fitting closely within said first wall of said frame, said frame member being substantially more rigid than said frame; and
a screen fixed to said third wall of said frame.

* * * * *